Aug. 7, 1951  G. R. WOOD  2,563,768
INDICATOR DRIVE STRUCTURE FOR COFFEE MILLS
Filed April 11, 1946  3 Sheets-Sheet 1
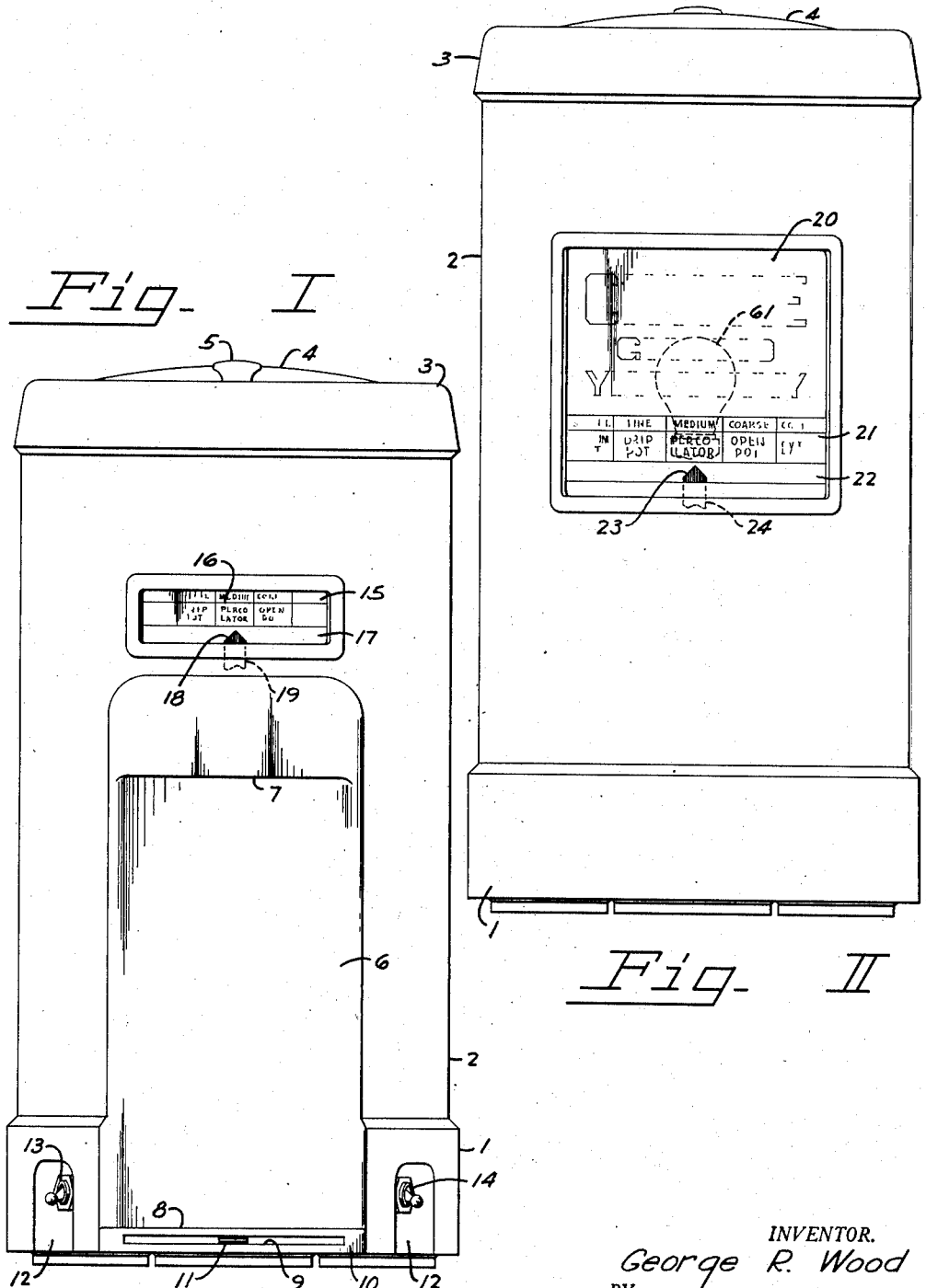
INVENTOR.
George R. Wood
BY
Marshall & Marshall
ATTORNEYS

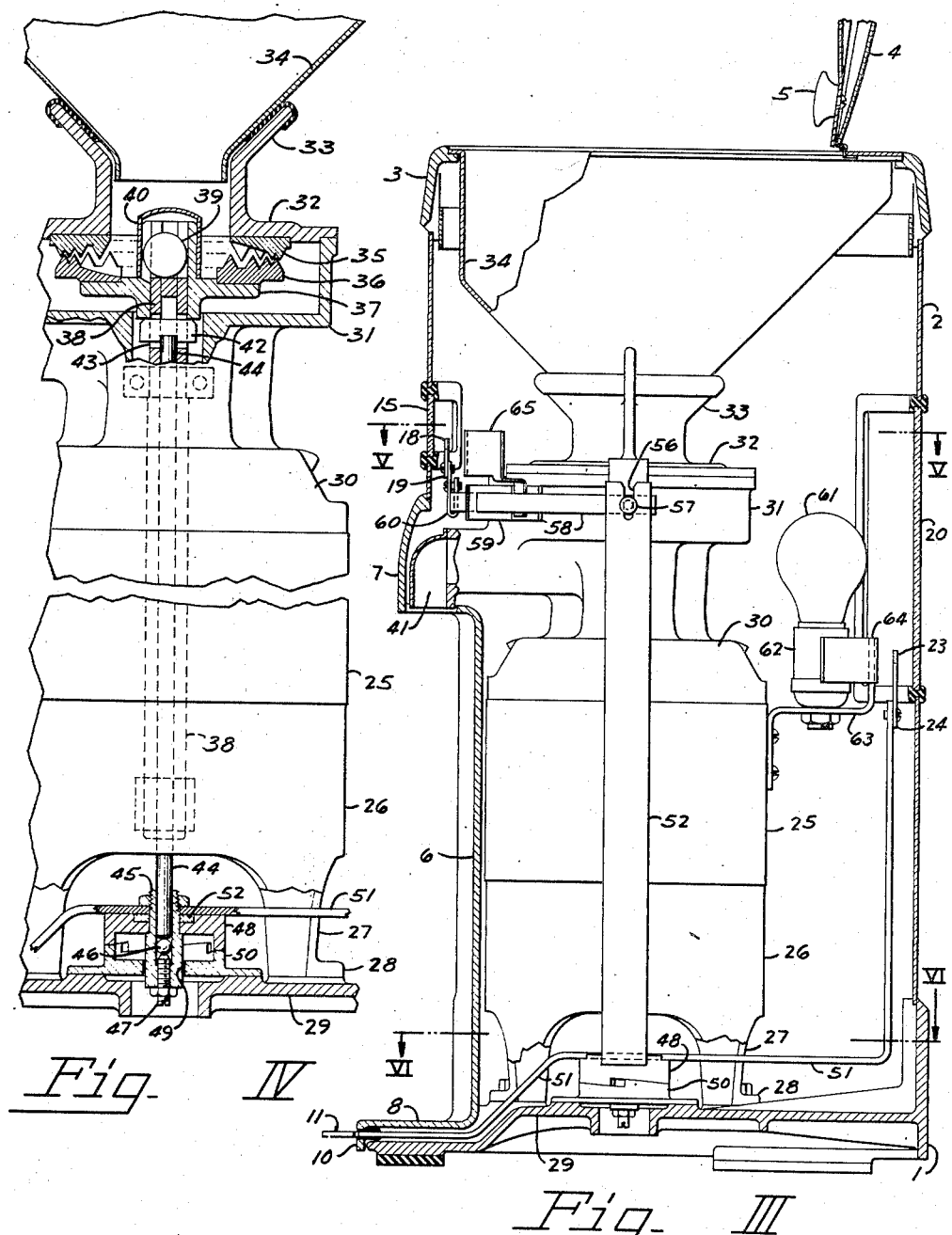

Aug. 7, 1951  G. R. WOOD  2,563,768
INDICATOR DRIVE STRUCTURE FOR COFFEE MILLS
Filed April 11, 1946  3 Sheets-Sheet 3
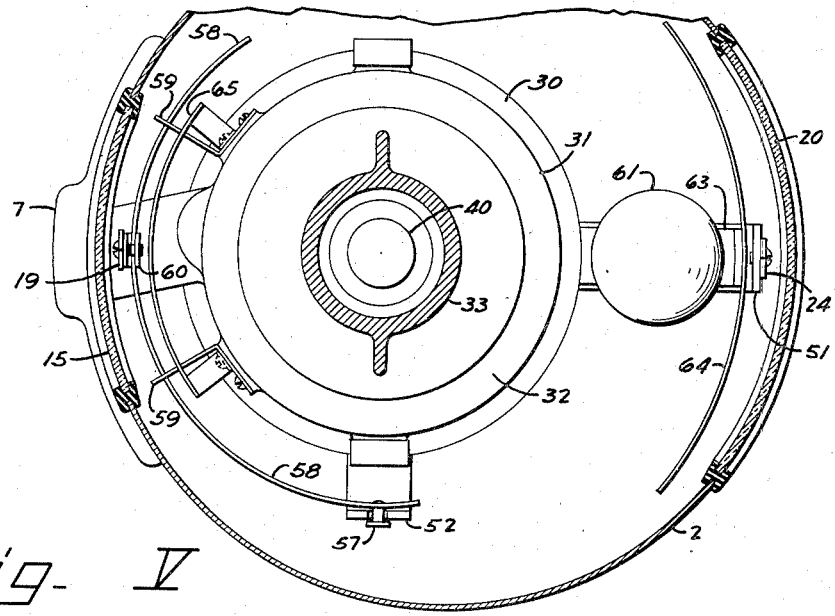
Fig. V
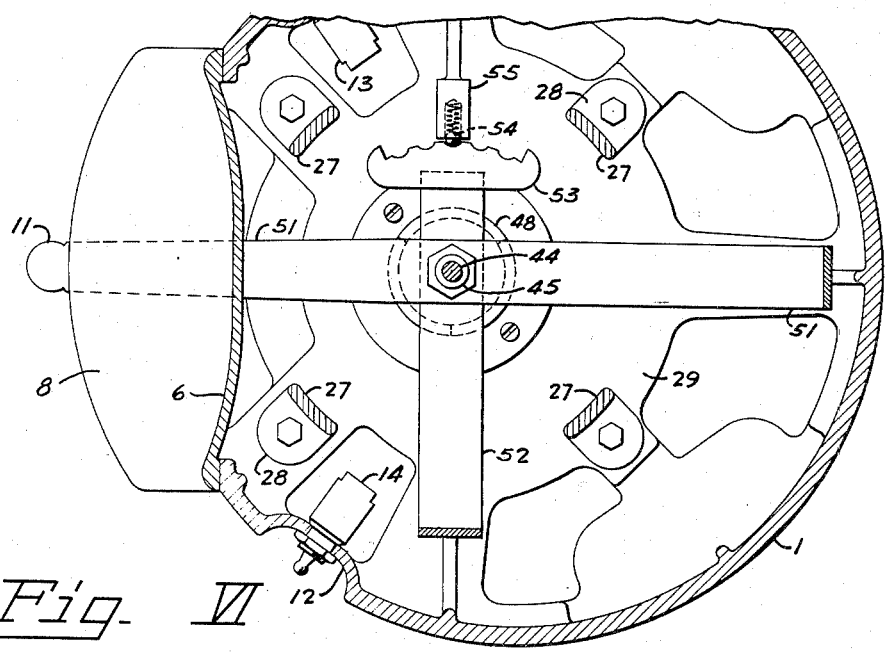
Fig. VI
INVENTOR.
George R. Wood
BY
Marshall & Marshall
ATTORNEYS

Patented Aug. 7, 1951

2,563,768

UNITED STATES PATENT OFFICE 2,563,768

INDICATOR DRIVE STRUCTURE FOR COFFEE MILLS

George Rue Wood, Toledo, Ohio, assignor to Toledo Scale Company, Toledo, Ohio, a corporation of New Jersey Application April 11, 1946, Serial No. 661,443

1 Claim. (Cl. 241—101)

This invention relates to coffee mills and in particular to a coffee mill having indicators near eye level on both the customer's and the merchant's sides of the mill, the indicators indicating the type of grind for which the coffee mill is set.

One of the problems encountered in designing a coffee mill for use in retail establishments is the provision of adequate indications so that both the customer and an inexperienced clerk may unmistakably know the adjustment of the coffee mill.

The principal object of the present invention is to provide legible, unmistakable indication of the grinding adjustment of a coffee mill, the indications being remote from the mechanism for adjusting the burr clearance.

A further object is to provide back-lighted translucent charts upon which the adjustment of burr clearance of the coffee mill is indicated.

Another object is to provide mechanism for producing indications of adjustment of the burr clearance which mechanism does not include a manually operable lever as an element thereof.

According to the present invention these objects are attained in a coffee mill of the vertical type employing a cylindrical housing by mounting a translucent window above the discharge opening of the coffee mill and another translucent window in the diametrically opposite side of the housing. In the coffee mill selected for illustration the clearance between the grinding burrs is regulated by cam mechanism installed beneath the motor and connected to the burrs by an adjusting rod extending through a tubular armature shaft of the motor. Indicators, mounted on or actuated by arms extending first outwardly from the cam mechanism then upwardly between the motor and the housing, cooperate with indicia printed on the translucent windows. Transparent slots are left adjacent the indicia to reveal the indicators. The operating handle of the cam adjusting mechanism extends out of the base of the coffee mill and is independent of the indicating mechanism except for their common connection to the cam mechanism. This feature prevents any false indications because no motion can be transmitted from the operating handle to the indicators without moving the cam mechanism.

Artificial illumination is provided within the housing of a coffee mill to make the indications easily readable. The interior of the housing and the exterior surface of the mechanism located within the housing are preferably painted white or some light reflective color so that both windows may be evenly illuminated from a single light source.

Other features and advantages of the invention are apparent from the accompanying drawings and detailed description of a specific example of a coffee mill selected to illustrate the invention.

In the drawings:

Figure I is a front elevation of a coffee mill embodying the improved indicating mechanism.

Figure II is a back—or customer's—view of the improved coffee mill.

Figure III is a vertical section of the housing of the coffee mill showing the arrangement of the mechanism contained therein.

Figure IV is a fragmentary vertical elevation of the coffee mill showing the grinding chamber and the burr clearance mechanism in section.

Figure V is a horizontal section taken substantially along the line V—V of Figure III.

Figure VI is a horizontal section taken substantially along the line VI—VI of Figure III.

These specific figures and the accompanying description merely illustrate the invention and are not intended to impose limitations upon the claim.

A vertical type coffee mill whose housing is substantially cylindrical serves to illustrate the invention. The housing comprises a cylindrical base 1 having a low side wall, a cylindrical sheet metal side wall 2 and a tapered hopper supporting ring 3 serving as a cap for the side wall 2. The hopper is closed by a cover 4 which for convenience in opening is provided with a knob 5. On the operator's side of the coffee mill a substantial portion of the tubular side wall 2 is removed to provide space for a bag stand 6 whose upper portion is extended forward to provide a hood 7 overlying and concealing the coffee discharge opening of the coffee mill. The bottom of the bag stand 6 has a shelf 8 on which coffee bags may rest in position to receive ground coffee as it is discharged from the mill. A slot 9 cut in an apron 10 depending from the front edge of the shelf 8 accommodates a handle 11 of burr clearance adjusting mechanism mounted in the base 1.

A pair of niches 12 one on either side of the bag stand 6 provide protected mounting space for electrical switches 13 and 14 used to control the grinder motor and a source of illumination installed within the housing.

A translucent chart or window 15 is mounted in the side wall 2 directly above the bag stand 6. The translucent portion of the window is provided with indicia 16 corresponding to the various degrees of fineness of grind provided by the mill.

A transparent section 17 immediately below the indicia 16 reveals a colored tip 18 of an indicator 19.

The customer's side of the housing, the side shown in Figure II, has a large translucent chart or window 20. The upper portion of the window area may be devoted to advertising matter designed to attract the customer's attention. Indicia 21 extending across the lower portion of the window correspond to the indicia 16. Immediately below the indicia 21 a transparent section 22 of the window 20 reveals a tip 23 of an indicator 24. The indicators 19 and 24 are interconnected so that their indications correspond.

The motor 25, whose lower end frame 26 has legs 27 terminating in feet 28 secured to a horizontally extending shelf 29 of the base 1, supports, on its upper end frame 30 a grinding chamber 31. The top of the grinding chamber 31 is closed by an easily removed cover 32 having an upwardly directed opening terminating in a funnel shaped mouth 33. Coffee to be ground, either in the form of beans or previously coarsely ground, is placed in a hopper 34 which rests in the supporting ring 3. From the hopper 34 (Figure IV) coffee flows down through the mouth of the cover 32 and radially outwardly between grinding burrs 35 and 36 into the outer portion of the chamber 31. The upper stationary grinding burr 35 is rigidly secured in the cover 32 which is piloted and locked to the top of the chamber 31. The lower grinding burr 36 is carried on a rotating table 37 which is slidably mounted on the upper end of a tubular armature shaft 38 of the motor 25. The upper end of the tubular armature shaft 38 and one side of the upper hub of the rotating table 37 are slotted to receive a metallic disk 39 serving as a sheer key to transmit torque from the motor shaft to the rotating burr. The key is held in place by a cap 40 fitted over the upper hub of the rotating table 37.

Ground coffee as it leaves the grinding burrs 35 and 36 is swept from the chamber 31 and discharged through an opening in the bottom of the chamber 31 into a horizontal passage formed as part of the grinding chamber casting. The ground coffee is conveyed through this passage and out through a discharge opening 41 located within the hood 7.

The lower hub of the rotating table 37 rests on a key 42 inserted through a broached hole 43 in the tubular armature shaft 38. An adjusting rod 44 extending axially through the tubular shaft 38 supports the key 42 and thus relieves the tubular motor shaft of any end thrust due to forces developed between the burrs. The broached hole 43 provides sufficient clearance to permit a full range of burr clearance adjustment.

The lower end of the adjusting rod 44 is journaled in a socket bored axially in a short stud 45. A steel ball 46 supported on an adjusting screw 47 absorbs the end thrust of the adjusting rod 44. The short stud 45 is secured in a cam member 48 and by extending downwardly through a hole 49 in the web of a stationary cam member 50 serves to hold the cam members 48 and 50 in axial alignment. The juxtaposed faces of the cam members 48 and 50 are each provided with three 120° helical surfaces so that rotation of the upper movable cam member 48 raises or lowers the adjusting rod 44 and thereby varies the clearance between the grinding burrs 35 and 36.

The top of the rotating cam member 48 has cross grooves of substantial width milled across it. One of the grooves is deeper than the other. A piece of formed strip stock 51 whose width is substantially equal to the width of the grooves provides both an operating lever and a support for the indicator 24. The end forming the operating lever portion extends forwardly from beneath the bottom frame 26 of the motor 25, between the shelf 8 and a depressed portion of the shelf 29 of the base 1, and terminates in the handle 11 protruding from the apron 10 of the shelf. The other end of the strip 51 extends rearwardly to the point adjacent the wall of the base 1 and then upwardly to a point slightly below the bottom edge of the translucent window 20. The indicator 24 is attached to this end of the strip. Another similar strip 52 is fitted in the other groove in the top of the cam member 48 with one end of the strip extending only a short distance beyond the periphery of the cam. This end of the strip has a detent plate 53 welded to it, the detent plate being adapted to cooperate with a spring pressed ball 54 mounted in a block 55 secured to the shelf 29 of the base 1. The detent serves to hold the cam in whatever position may be selected by manipulation of the handle 11.

The other end of the strip 52 extends horizontally to a point outside of the motor 25 and then upwardly along the side of the motor to the general level of the grinder chamber 31. The upper end of the upright portion of the strip 52 has a vertical notch 56 engaged by a rivet 57 set in an arcuate strip 58 in such a manner that the arcuate strip 58 is driven circumferentially with respect to the housing upon rotation of the cam member 48. The arcuate strip 58 is carried in a pair of slotted brackets 59 extending generally radially from the grinder chamber 31. A folded U-shaped indicator mount 60 is clamped on the arcuate strip 58 with the indicator 19 suitably located with respect to the indicia 16 inscribed on the window 15.

The translucent windows 15 and 20 are illuminated from within the coffee mill housing by an incandescent lamp 61 whose socket 62 is supported from a bracket 63 attached to the motor frame. Because the interior of the housing is painted either white or some other light reflective color one bulb is sufficient to adequately illuminate both windows. Light shields 64 and 65 mounted behind the transparent slots in the windows 20 and 15 respectively serve as backgrounds for the indicator tips as well as subduing the light emitted from the transparent strips of the windows.

This arrangement of mechanism provides a direct, simple connection between the clearance adjusting mechanism and the customer's indication. Because of the offset between the axis of the motor and the axis of the housing, the radial portion of the strip 51 is quite long so that relatively great indicator travel is easily obtained. The merchant's indication although not quite as simple because it must be located over the bag stand is, nevertheless, direct. The support provided for the merchant's indicator by the brackets 59 prevents any amplification of vibration or oscillation when the burr clearance is being adjusted or the mill is operated. Because of the relatively lesser travel of the merchant's indicator and the smaller size of the translucent window 15 as well as to prevent binding in the brackets 59, the arcuate strip 58 is given a true horizontal motion and the helical movement of the strip 52 produced by the cam mechanism is accommodated by the slot connection to the strip 58.

While the selected example illustrates a preferred form of indication many modifications of the mechanism may be embodied without departing from the scope of the invention.

Having described the invention, I claim:

An indicator drive structure for a coffee mill comprising, in combination, a control located in the base of the mill for regulating the fineness of grind of the mill, a plurality of slotted brackets extending laterally from an upper portion of the mill, an arcuate strip slidably mounted in the slots of said brackets, an index carried on said arcuate strip, an arm attached to and extending laterally from the grinding control in the region beneath the motor, an upwardly directed extension on the arm extending to the region above the motor, and a pin and slot connection from the arm extension to the arcuate strip.

GEORGE RUE WOOD.

REFERENCES CITED

The following references are of record in the file of this patent:

UNITED STATES PATENTS

| Number | Name | Date |
| --- | --- | --- |
| 1,972,758 | Bowman | Sept. 4, 1934 |
| 2,019,013 | Kopf et al. | Oct. 29, 1935 |
| 2,094,548 | Meeker | Sept. 28, 1937 |
| 2,138,204 | Rable | Nov. 29, 1938 |
| 2,141,310 | Meeker | Dec. 27, 1938 |
| 2,142,203 | Morgan | Jan. 3, 1939 |
| 2,424,570 | Jenks | July 29, 1947 |